(12) United States Patent
Lanoiselee et al.

(10) Patent No.: US 9,185,704 B2
(45) Date of Patent: Nov. 10, 2015

(54) DATA RECEPTION DEVICE AND CORRESPONDING RECEPTION METHOD, COMPUTER PROGRAM AND RECORDING MEDIUM

(75) Inventors: Marc Lanoiselee, La Chapelle-des-Fougeretz (FR); Laurent Cariou, Rennes (FR)

(73) Assignee: France Telecom, Paris (FR)

( * ) Notice: Subject to any disclaimer, the term of this patent is extended or adjusted under 35 U.S.C. 154(b) by 359 days.

(21) Appl. No.: 13/883,948

(22) PCT Filed: Oct. 28, 2011

(86) PCT No.: PCT/FR2011/052540
§ 371 (c)(1),
(2), (4) Date: Jul. 22, 2013

(87) PCT Pub. No.: WO2012/066209
PCT Pub. Date: May 24, 2012

(65) Prior Publication Data
US 2014/0003265 A1    Jan. 2, 2014

(30) Foreign Application Priority Data
Nov. 8, 2010 (FR) ...................... 10 59206

(51) Int. Cl.
*H04B 1/00* (2006.01)
*H04B 1/28* (2006.01)
*H04W 72/04* (2009.01)

(52) U.S. Cl.
CPC ......... *H04W 72/0453* (2013.01); *H04B 1/0032* (2013.01); *H04B 1/0035* (2013.01); *H04B 1/0039* (2013.01); *H04B 1/28* (2013.01)

(58) Field of Classification Search
None
See application file for complete search history.

(56) References Cited

U.S. PATENT DOCUMENTS 6,690,735 B1    2/2004    Maddiotto et al.
(Continued)

OTHER PUBLICATIONS

English translation of the International Preliminary Report on Patentability and Written Opinion of the International Searching Authority dated May 14, 2013 for corresponding International Patent Application No. PCT/FR2011/052540 filed Oct. 28, 2011.
(Continued)

*Primary Examiner* — Jenee Williams
(74) *Attorney, Agent, or Firm* — David D. Brush; Westman, Champlin & Koehler, P.A.

(57) ABSTRACT

A data reception device in a communication network using a plurality of radio frequency channels. At least two adjacent radio frequency channels are concatenated so as to form a concatenated channel. The device is configured to receive "received" data transmitted in at least one radio frequency channel of the concatenated channel; transpose the received data at an intermediate frequency, thus outputting data at an intermediate frequency; filtering the data at the intermediate frequency with a filter including at least two separate filtering channels, each filtering channel including a band-pass filter, the frequency band of which corresponds to the frequency band of a separate radio frequency channel of the concatenated channel such that the total frequency band of the filters is equal to the frequency band of the concatenated channel; activating at least one of the filtering channels; and recombining data from the filtering channels.

10 Claims, 4 Drawing Sheets

(56) References Cited

U.S. PATENT DOCUMENTS

| | | |
|---|---|---|
| 2003/0058891 A1* | 3/2003 | Nobbe et al. ............... 370/488 |
| 2003/0227896 A1* | 12/2003 | Mollenkopf et al. ......... 370/342 |
| 2005/0180332 A1* | 8/2005 | Kim et al. .................... 370/244 |
| 2005/0185575 A1* | 8/2005 | Hansen et al. ............... 370/208 |
| 2008/0062856 A1* | 3/2008 | Feher ........................... 370/206 |
| 2008/0112519 A1 | 5/2008 | Jung et al. |
| 2009/0154446 A1* | 6/2009 | Adler et al. .................. 370/350 |
| 2009/0170444 A1* | 7/2009 | Retnasothie et al. ........... 455/73 |
| 2009/0190563 A1* | 7/2009 | Lee et al. ..................... 370/337 |

OTHER PUBLICATIONS

International Search Report dated Apr. 10, 2012 for corresponding International Patent Application No. PCT/FR2011/052540 filed Oct. 28, 2011.

IEEE Computer Society "Part 11: Wireless LAN Medium Access Control (MAC) and Physical Layer (PHY) Specifications", IEEE Std 802.11n-2009, Oct. 29, 2009, 536 pages.

French Search Report dated Jun. 24, 2011 for corresponding French Patent Application No. 1059206, filed Nov. 8, 2010.

* cited by examiner

DATA RECEPTION DEVICE AND CORRESPONDING RECEPTION METHOD, COMPUTER PROGRAM AND RECORDING MEDIUM

CROSS-REFERENCE TO RELATED APPLICATIONS

This Application is a Section 371 National Stage Application of International Application No. PCT/FR2011/052540, filed Oct. 28, 2011, which is incorporated by reference in its entirety and published as WO 2012/066209 on May 24, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The field of the invention is that of radiofrequency communications and more particularly that of the management of frequency resources between the different apparatuses of a communications network. The invention can be applied especially but not exclusively to wireless local area network apparatuses and for example to systems transmitting in a frequency bandwidth situated around 2.4 GHz or 5 GHz, in which especially apparatuses work according to the IEEE 802.11n standard or its revised versions, commonly called WiFi standards.

The term "apparatus" is therefore understood herein to mean especially an element belonging to a basic service set (BSS) formed by an access point (AP) or a wireless personal network coordinator (called a "PicoNet coordinator" or PNC) and the stations associated with this access point, i.e. the stations situated in the coverage zone of this access point. More specifically, the invention pertains to WLAN (Wireless Local Area Network) radiofrequency transmissions requiring dynamic modification of the frequency bandwidth being transmitted.

BACKGROUND

The IEEE 802.11n standard defines a protocol enabling data transmission on a 40 MHz bandwidth in grouping together or "concatenating" two adjacent 20 MHz channels (the WiFi classically works on 20 MHz channels).

A protocol of this kind defines a primary channel to which a channel-assigning mechanism, known as the CSMA-CA (carrier sense multiple access with collision avoidance) mechanism, is applied, and a secondary channel, on which the CSMA-CA mechanism is not performed. This secondary channel however is scanned by means of a physical layer mechanism called a CCA (Clear Channel Assessment) in order to check the occupancy of this channel. This check is made for a duration denoted as PIFS (or "point coordination function interframe spacing" of 25 to 36 μs according to the IEEE 802.11n standard), when transmission on a 40 MHz frequency bandwidth is envisaged.

For reasons of backward compatibility, the transmission of payload data on a channel with a 40 MHz bandwidth, called a "concatenated" channel, must be preceded by the transmission of preambles on the primary channel (of 20 MHz bandwidth) and on the secondary channel (also of 20 MHz bandwidth), and must be understood by any station that can receive data only on a 20 MHz bandwidth.

However, the receiver stations do not know if the forthcoming transmission will be made on a 20 MHz bandwidth or a 40 MHz bandwidth. They must therefore receive these preambles on a 20 MHz bandwidth only, preferably on the primary channel, because the secondary channel may be occupied by transmissions from other stations or other access points (AP), and they must receive these preambles until reception of an HT-SIG2 signaling field, where a signaling bit informs the receiver of the bandwidth used for the transmission in progress (20 MHz or 40 MHz).

In the case of a transmission using a 40 MHz band, the receiver must then change its bandwidth in order to receive data on a 40 MHz bandwidth (corresponding to a primary channel and to the secondary channel) and no longer on a 20 MHz bandwidth (corresponding to the primary channel).

Present-day receivers generally adopt permanent reception on a 40 MHz bandwidth. However, such a technique has the drawback of incurring interference on the secondary channel during a transmission limited to 20 MHz on the primary channel alone. Indeed, the secondary channel can be occupied by an adjacent station or access point and the data transmitted on this secondary channel must also be received by the receiver. In particular, the drawback of this approach lies in the fact that the ratio between the amplitudes of the data to be transmitted on these two channels is not controlled. Indeed, if the secondary channel carries data having an amplitude greater than the amplitude of the data of the primary channel by several tens of decibels (dB), then the reception on the primary channel can be greatly deteriorated, or even be completely compromised.

Figure 1A:
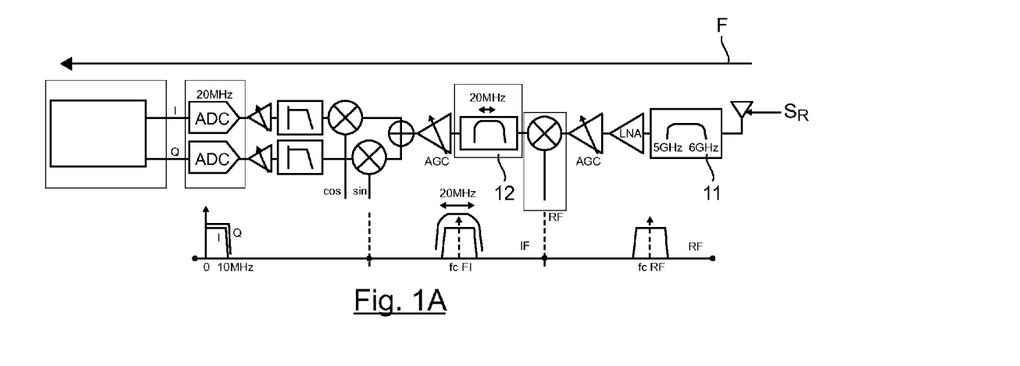
FIGS. 1A and 1B described with reference to the prior art present a known type of superheterodyne receiver, FIGS. 2A and 2B described with reference to the prior art show a known type of "Zero-IF" receiver.
Figure 1B:
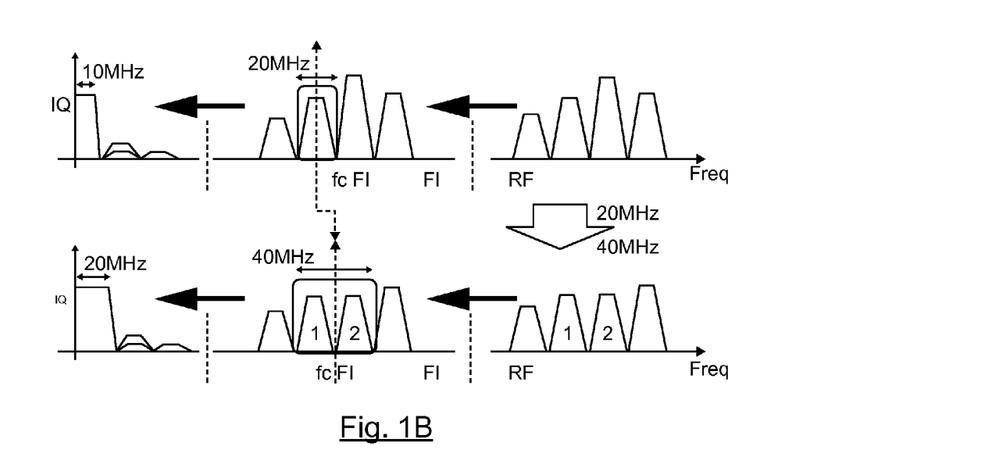
Figure 2A:
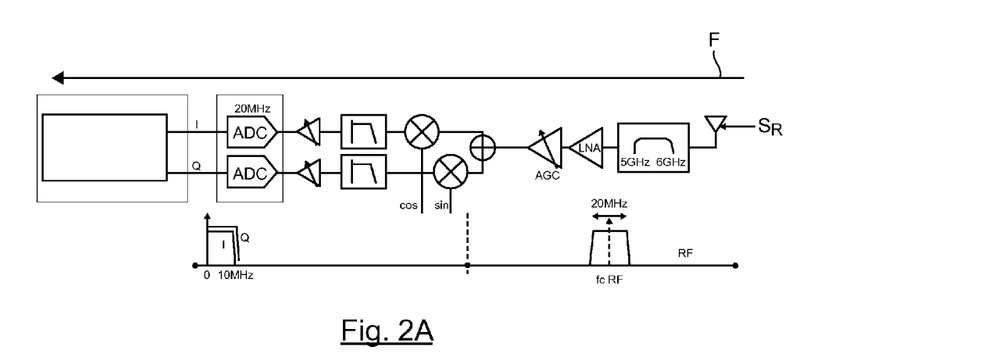
Figure 2B:
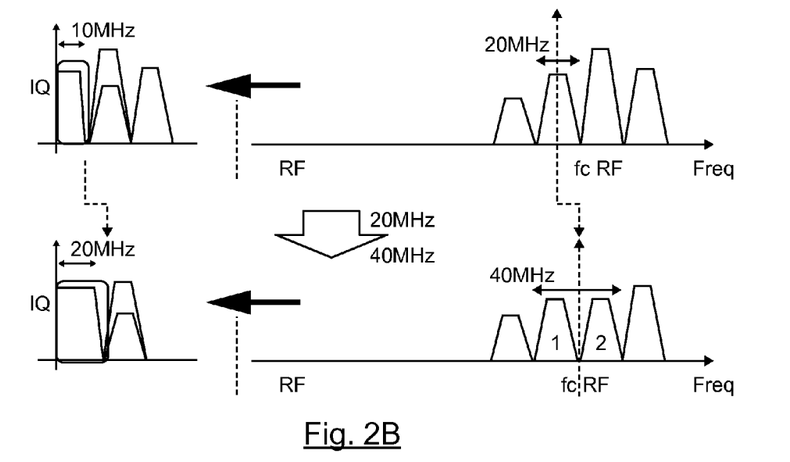

To overcome these drawbacks, two prior-art solutions have been proposed, respectively implementing reception with dual frequency change, corresponding to what is known as the superheterodyne principle illustrated in FIGS. 1A and 1B, or reception with direct conversion, also known as "Zero-IF" reception illustrated in FIGS. 2A and 2B (the sense of the reception being illustrated by the arrow F).

The dual frequency change receiver is shown in FIG. 1A in a configuration for receiving a signal $S_R$ transmitted in a 20 MHz pass-band channel. The received signal is a radiofrequency signal, in a frequency bandwidth situated between 5 and 5.9 GHz for example, filtered with this bandwidth by a first filter 11, and then converted into an intermediate frequency signal. Then, a second selective filter 12 of 20 MHz width eliminates the potentially disturbing adjacent signals.

As illustrated in FIG. 1B, to pass from transmission on a 20 MHz bandwidth to transmission on a 40 MHz bandwidth with the aim, in each case, of maintaining the best possible quality of reception, the dual frequency change receiver must change its intermediate frequency (with a 10 MHz offset) and its filter to adapt to the broadening of the bandwidth. In this case, the 20 MHz bandwidth filter is replaced by a 40 MHz bandwidth filter.

The second principle of reception, of a Zero-IF type, is shown in FIG. 2A. In this configuration, the signal is transposed directly into baseband by an oscillator whose frequency is the center frequency of the channel sought. The elimination of the potentially disturbing adjacent signals is ensured this time in baseband by highly selective low-pass filters.

As illustrated in FIG. 2B, to pass from 20 MHz transmission to 40 MHz transmission with the aim, in each case, of maintaining the best possible quality of reception, it is the radiofrequency transposition oscillator of the Zero-IF type receiver that must be offset in frequency and the baseband low-pass filters that must be broadened from 10 MHz to 20 MHz.

Thus, in these two techniques of reception, the dynamic passage, during transmission, from implementation at 20 MHz to implementation at 40 MHz of channel width comes up against:
- changes of the intermediate frequency (IF) or baseband filters that will necessitate a certain time of adaptation in amplitude of the data to be transmitted and in terms of delay in particular, these changes therefore possibly causing an interruption in transmission (through loss of synchronization),
- change in the frequency of the oscillators in intermediate frequency (IF) or RF responsible for making frequency transpositions, which could causes the same disturbances as in the case of the switching of the filters.

Thus, the inventors have noted that, at present, the reconfiguration of the receiver from a 20 MHz reception bandwidth to a 40 MHz reception bandwidth is a blocking point because no simple and satisfactory method can be directly seen, even partially, for managing a dynamic modification of bandwidth from 20 to 40 MHz without causing disturbance on a transmission preliminarily set on a 20 MHz bandwidth.

Here below, the term "configuration of reception" refers to a mode of reception characterized by its reception bandwidth. For example, in the case applied to the IEEE 802.11n standard, there will be a first 20 MHz configuration of reception corresponding to reception on a 20 MHz bandwidth, and a second 40 MHz configuration of reception corresponding to reception on a 40 MHz bandwidth.

SUMMARY

The invention proposes a novel approach, which does not have all these drawbacks of the prior art, in the form of a device for receiving data transmitted in a communications network using a plurality of radiofrequency channels, at least two adjacent radiofrequency channels being concatenated to form a concatenated channel.

According to the invention, such a device comprises:
- means for receiving data transmitted in at least one radiofrequency channel of said concatenated channel, called received data,
- means for transposing said received data into intermediate frequency, delivering data at intermediate frequency,
- means for filtering said data at intermediate frequency, said means for filtering comprising at least two distinct filtering paths, each filtering path comprising a band-pass filter, the frequency bandwidth of which corresponds to the frequency bandwidth of a distinct radiofrequency channel of said concatenated channel, such that the overall frequency bandwidth of said filters is equal to the frequency bandwidth of said concatenated channel,
- means for activating at least one of said filtering paths, enabling the filtering of said received data,
- means for recombining the data coming from said filtering paths.

The invention thus proposes a novel type of receiver enabling a dynamic modification of the width of the frequency bandwidth of transmission being received.

Such a receiver is simple to implement and maintains a synchronization at reception, owing to the use of means for filtering comprising at least two distinct filtering paths. Such means for filtering enable filtering at intermediate frequency in removing the need for changing intermediate frequency (IF) filters, classically needed to adapt to the width of the frequency bandwidth conveying the payload data.

The proposed receiver thus makes it possible to avoid any interruption of the reception of data.

The use of such means for filtering also makes it possible to avoid disturbances due to changes in frequency of the intermediate frequency (IF) or RF oscillators, responsible for carrying out frequency transpositions.

Indeed, the device according to the invention derives advantage from the presence of at least two distinct filtering paths each comprising a band-pass filter, the frequency bandwidth of which corresponds to the frequency bandwidth of a distinct radiofrequency channel. According to the aimed application, the device according to the invention implements as many filtering paths as there are radiofrequency channels forming the concatenated channel. Once combined, these different band-pass filters form a uniform band-pass filter, the bandwidth of which corresponds to the bandwidth of the concatenated channel. In other words, in the case applied to the IEEE 802.11n standard, the concatenated channel is formed by two adjacent radiofrequency channels each having a bandwidth equal to 20 MHz and the width of the overall frequency bandwidth associated with the concatenated channel is 40 MHz.

Thus, the band-pass filters of each filtering path are offset for example by 20 MHz and the "overall" filter obtained in combining these different band-pass filters has a bandwidth of 40 MHz. One and/or the other one of these filtering paths is then activated by activation means.

Consequently, a receiver according to the invention gives higher efficiency of dynamic passage from one configuration of reception to another, during reception. For example, for passing from a configuration of reception at 20 MHz to a configuration of reception at 40 MHz, the change-over from 20 MHz to 40 MHz bandwidth (or vice versa from 40 MHz to 20 MHz) does not modify the conditions of reception on the 20 MHz primary channel associated with a first filtering path.

Indeed, the first filtering path is for example activated whether the configuration of reception is at 40 MHz or at 20 MHz, and remains activated during the change-over from a configuration of reception at 20 MHz to reception at 40 MHz (implementing the activation of a second filtering path) or vice versa during the change-over from a configuration of reception at 40 MHz to reception at 20 MHz.

Thus, a receiver according to the invention implements different configurations of reception at a bandwidth that is variable during reception and without interruption of reception, while maintaining optimal reception on at least one radiofrequency channel.

According to one particular embodiment, said means for activating comprise at least one variable gain amplifier.

Indeed, according to a first example, a single variable gain amplifier can control the different filtering paths.

According to another example, the means for activating comprise a variable gain filter for each filtering path. Thus, each filtering path is distinct and independent and implements a gain control which will enable the activation or deactivation of a band-pass filter of the filtering path and the passage from one configuration of reception to another without disturbance, in combining the data coming from the different filtering paths.

The use of variable gain amplifiers furthermore enables a fluid and gradual activation/deactivation of the filtering paths without causing any break in the reception of payload data.

Furthermore, gain control that is independent for each filtering path enables an adjustment of the amplitudes of the responses coming from each activated filtering path.

According to one particular characteristic, said band-pass filters have templates intersecting at −6 dB.

Thus, these band-pass filters are such that they form a single filter with a uniform bandwidth when they are combined, ideally with a cut-off point at −6 dB when the phase response of these two filters is identical at this point. The invention thus provides an ideal response of the concatenated channel.

Indeed, the filters have templates for which the recombination constitutes precisely a filter whose bandwidth is equal to the bandwidth of the concatenated channel.

For example, for a signal received in a concatenated channel having a 40 MHz bandwidth, the band-pass filters of each filtering path have a 20 MHz frequency template and the response curves of these two filters offset by 20 MHz intersect and have an attenuation of 6 dB. The summing of these two filters offset by 20 MHz therefore enables the formation of an ideal filter with a 40 MHz frequency template without any attenuation at the junction of the two filters.

According to one particular aspect of the invention, the device for receiving furthermore comprises means for measuring the power of said received data on each radiofrequency channel of said concatenated channel, and said means for activating take account of said measurements of power.

Thus, it is possible to know the respective power of each of the two radiofrequency channels. These means therefore enable the scanning of the radiofrequency channels in order to determine especially the desired configurations of reception. The variable gain amplifiers then use these pieces of information to carry out gain control as a function of the determined configuration of reception.

According to one particular characteristic of the invention, the device for receiving comprises means for obtaining a piece of signaling information, signaling a transmission of said data received on at least one radiofrequency channel of said concatenated channel, and said means for activating take account of said piece of signaling information.

In this way, the technique according to the invention determines the bandwidth needed as soon as the transmitted signal is received, in other words it determines the number of channels used to transmit the data. Depending on this piece of signaling information, the means for activating activate/deactivate the band-pass filter of each filtering path.

In the case of the IEEE 802.11n standard, the signaling information is especially contained in the signaling field HT-SIG2, where a signaling bit informs the receiver that the transmission in progress is done on a 20 MHz or 40 MHz bandwidth.

According to a first particular embodiment, said device furthermore comprises:
  means for demodulating data coming from said means for recombining delivering the demodulated data on a quadrature path and a phase path;
  first means for filtering and for analog-digital conversion of the data demodulated on said quadrature path;
  second means for filtering and for analog-digital conversion of the demodulated data on said phase path.

According to this first embodiment, most of the components of the classic superheterodyne receiver are reused, thus limiting the modifications of existing devices.

Moreover, in a novel and inventive way, the invention integrates at least two distinct filtering paths enabling a dynamic modification of the configuration of reception, i.e. an adaptation of the reception bandwidth.

Besides, a device for receiving of this kind can also be used as a sending/receiving device in order to pool the constituent elements common to transmission and reception so as not to duplicate them.

According to a second particular embodiment, said device also comprises:
  means for transposing, into baseband, the data coming from said means for recombining, delivering baseband data;
  means for filtering and for analog-digital conversion of said baseband data.

This second embodiment is advantageously simplified as compared with the first embodiment indicated here above, while at the same time enabling an equivalent processing of the received data.

This second embodiment removes the need for means of demodulation on a quadrature path and a phase path, thus ultimately saving on means of analog-digital conversion since only one digital-analog converter is necessary here whereas two digital-analog converters were necessary in the first embodiment.

Indeed, this second embodiment directly implements the means for transposing the received data into intermediate frequency, followed by means for transposing into baseband on a single path. The bandwidth of this single path is twice as wide great as that of the two paths in phase and in quadrature of the first embodiment. The pieces of received data are thus transmitted on this single path similarly to the transmission on the two paths according to the first embodiment.

The pieces of data in baseband transmitted by this single path are then converted into digital data at a sampling frequency which is double than that of the first embodiment.

Thus, unlike in the case of the first embodiment, it is no longer necessary to use first and second means of analog-digital conversion and filtering dedicated respectively to the quadrature path and to the phase path.

According to a third particular embodiment, said device furthermore comprises:
  means of analog-digital conversion of the data coming from said means for recombining.

This third embodiment also has a simplification relative to the second embodiment described here above.

This third embodiment removes the need for means for transposing into baseband and derives advantage from the means of analog-digital conversion.

Indeed, according to this third embodiment, the means of analog-digital conversion used have very wide analog bandwidths, in frequency ranges going beyond the sampling frequency required for sub-sampling the received data. Thus, the means for analog-digital conversion according to this third embodiment are capable of sub-sampling the data coming from the means for recombining. They are for example a component of an AD9433—Analog Devices (registered trademarks) type.

Thus, the means of analog-digital conversion of this third embodiment directly sub-sample the received data.

Consequently, unlike in the second embodiment, this third embodiment removes the need for means for transposing into baseband.

Another aspect of the invention also pertains to a method for receiving data transmitted in a communications network using a plurality of radiofrequency channels, at least two adjacent radiofrequency channels being concatenated to form a concatenated channel. The method comprises the following steps:

receiving data transmitted in at least one radiofrequency channel of said concatenated channel, called received data, activating at least one filtering path among at least two distinct filtering paths, each filtering path comprising a band-pass filter, the frequency bandwidth of which corresponds to the frequency bandwidth of a distinct radiofrequency channel of said concatenated channel, such that the overall frequency bandwidth of said filters is equal to the frequency bandwidth of said concatenated channel, filtering said received data, implementing said activated filtering path or paths.

Such a method is especially implemented by the device for receiving described here above. It could of course comprise the different characteristics of the device according to the invention. Thus, the characteristics and advantages of this method are the same as those of the device described here above. They are therefore not described in more ample detail.

In particular, the step for activating the filtering paths enables dynamic changing over from one configuration of reception to another.

Indeed, the step of activation enables the activation of as many filtering paths as there are adjacent frequency channels needed. For example, a configuration of reception of a signal transmitted on the concatenated channel formed by two concatenated adjacent radiofrequency channels activates two filtering paths.

Conversely, a configuration of reception of a signal transmitted on only one of the two adjacent radiofrequency channels forming the concatenated channel activates only one filtering path.

Configurations of reception implementing concatenated channels formed by more than two radiofrequency channels can also be deduced from the examples given here above.

The invention also pertains to a computer program comprising instructions for implementing the method for receiving as described here above, when this program is executed by a processor.

The invention also pertains to a recording medium for implementing a method described here above.

LIST OF FIGURES

Other features and advantages of the invention shall appear more clearly from the following description of a preferred embodiment, given by way of a simple illustratory and non-exhaustive example, and from the appended drawings, of which.

DESCRIPTION OF ONE EMBODIMENT OF THE INVENTION

1. General Principle

The general principle of the invention relies on a device for receiving radiofrequency data capable of being reconfigured automatically so as to adapt to a variation in bandwidth of the received data. To achieve this, a device of this kind implements at least two distinct filtering paths, for which the independent activation/deactivation by activating means enables the defining of different configurations of reception.

Thus, according to the invention, when the data is received, the bandwidth is dynamically modified without causing any disturbance in a transmission made preliminarily according to a distinct configuration of reception.

Figure 3:
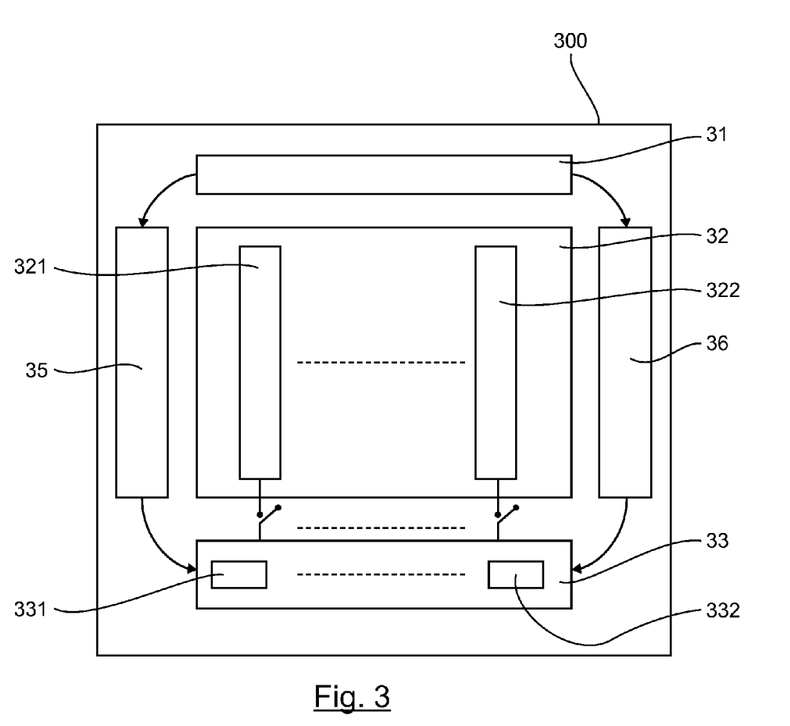
FIG. 3 presents the general structure of a device for receiving according to the invention.

FIG. 3 illustrates the general structure of a device for receiving according to the invention.

In general, the device 300 for receiving according to the invention comprises mainly the following elements: means 31 for receiving data transmitted in at least one radiofrequency channel, means 32 for filtering enabling the filtering of the received data and means 33 for activating at least one of the filtering paths.

Optionally, a device 300 of this kind also has means 35 for measuring power and/or means 36 for obtaining a piece of information for signaling a configuration of reception.

These different means, according to one particular example of implementation, are described more specifically here below.

The means for receiving 31 comprise especially an antenna, a filter corresponding for example to the 5-5.9 GHz band, a low-noise amplifier and an automatic gain control (AGC) device which amplifies and readjusts respectively the amplitudes (also called levels of gain) of the received data $S_R$.

The data coming from the processing operations performed by the means for receiving are then processed by means for filtering 32, comprising in this example two distinct filtering paths, which can be activated simultaneously or successively.

More specifically, each filtering path has at least one band-pass filter (respectively 321 for the first filtering path and 322 for the second filtering path). These band-pass filters are for example surface acoustic wave filters such as the EPCOS (registered mark) 374 MHz IF surface acoustic wave filter with the following properties:

- each filter complies with the mask of a filter for a radiofrequency channel. For example, in the case of the IEEE 802.11n standard, each filter has a 20 MHz bandwidth,
- each filter is offset relative to the other filter by the bandwidth of a radiofrequency channel, the radiofrequency channels filtered by each filter being adjacent.
- the templates of each of the filters ideally intersect at −6 dB when the phase response is identical at this point;
- the summing of the responses of the filters of each filtering path forms an ideal filter, the bandwidth of which corresponds precisely to the concatenation of the filtering bandwidth of each of the filters. For example, in the case of the IEEE 802.11n standard, we obtain an overall filter at 40 MHz. In this precise case, the summing of the two filters offset by 20 MHz therefore enables the formation of an ideal filter with a 40 MHz template without any attenuation at the junction of the two filters.

The different filtering paths can thereafter be activated or deactivated by the activating means 33. According to the example of FIG. 3, the activating means comprise an independent variable gain amplifier (331, 332) for each filtering path (321, 322).

In the case of the IEEE802.11n standard, the difference between the different configurations (20 MHz primary channel, 20 MHz secondary channel, 40 MHz) is done by modifying the gain controls described in detail here below with reference to FIG. 7B. This activation/deactivation, which can be gradual has the advantage of being fluid and causing no break in transmission/reception because no significant modification is caused on each filtering path.

On the contrary, according to the prior art, the need to carry out operations for switching filters and/or oscillators frequencies during the change-over between the different configurations of reception (20 MHz primary channel, 20 MHz secondary channel, 40 MHz) causes sudden and significant modifications of the response of the bandwidth that is being used at the time of the change-over.

The gradual activation/deactivation according to the invention enables the measurement and balancing of the filtering paths so that the signal-to-noise ratio of the analog/digital conversion is optimal whatever the configuration of reception. Thus, if the pieces of data are transmitted in only one radiofrequency channel, the amplitude of this data can be increased. If the pieces of data are transmitted in several radiofrequency channels, their respective amplitudes must this time be reduced so that the total amplitude at input of the analog/digital converter remains constant.

For the specific example of the IEEE 802.11n standard, only two configurations of reception at 20 MHz and 40 MHz are considered. However, the invention can be implemented for other applications requiring broader frequency reception bandwidths and the concatenation of more than two radiofrequency channels. Thus, multiple filtering channels and corresponding variable gain amplifiers can also be implemented according to the aimed application.

Besides, optionally, means for measuring power 35 make it possible to know the respective power of each of the two intermediate frequency channels.

With this information on power, and depending on the sought configuration of reception, gain control will then be done on the variable gain amplifiers situated in each of the filtering paths. This gain control will thus make it possible to pass gradually from one configuration of reception to another without disturbance, in combining the two filtering paths in terms of gain level.

Moreover, the device of the invention includes means 36 for obtaining a piece of information signaling the configuration of reception in which the device for receiving must be reconfigured.

For example, at reception of the signal, a piece of signaling information indicates that the transmission has been made on a 40 MHz bandwidth corresponding to the concatenation of two adjacent 20 MHz radiofrequency channels. The means for activating then take this piece of signaling information into consideration in order to activate the two corresponding filtering paths making it possible to obtain a reception at 40 MHz.

Conversely, if no piece of signaling information is detected at reception, the activating means consider a default configuration of reception. For example, this configuration may correspond to reception on a bandwidth of 20 MHz.

According to one alternative embodiment, the piece of signaling information is a piece of binary information indicating the number of radiofrequency channels used for transmission. Thus, for example, if we consider a reception of a variable bandwidth that can go up to a bandwidth of 60 MHz, the piece of binary signaling information is encoded on two bits, for example 00 corresponding to transmission done on a 20 MHz band, 01 for transmission on a 40 MHz bandwidth and 11 for transmission on a 60 MHz bandwidth.

In the case of the IEEE802.11n standard, the piece of signaling information is especially contained in the signaling field HT-SIG2, where a signaling bit informs the receiver that the transmission in progress is at 20 MHz or at 40 MHz.

2. Description of Different Embodiments

Figure 4:
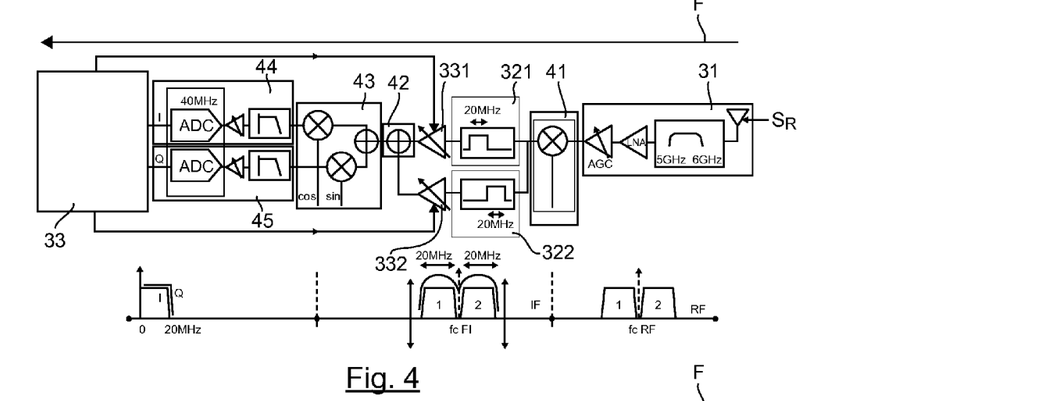
FIGS. 4 to 6 show different embodiments of a device for receiving according to the invention.
Figure 5:
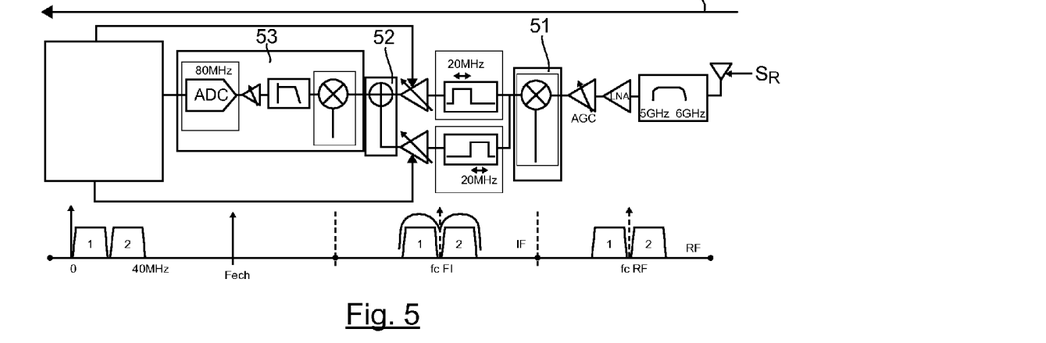
Figure 6:
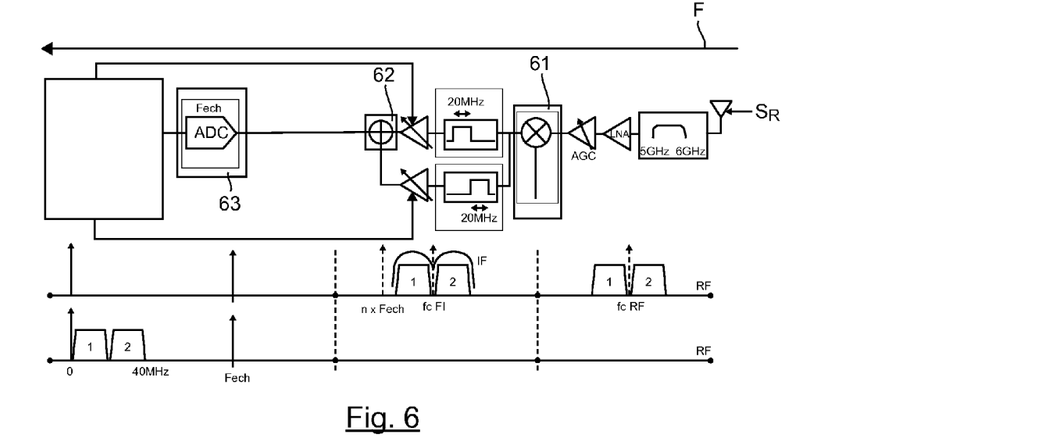

Referring to FIGS. 4 to 6, we present three embodiments of the device for receiving according to the invention. These three embodiments are to be used according to the IEEE802.11n standard.

Other configurations of receptions on broader bandwidths can also be considered, for example at 60 MHz, 80 MHz, 100 MHz, if we consider for example a concatenated channel formed by three, four or five 20 MHz radiofrequency channels and as many corresponding filtering paths.

2.1 First Embodiment

FIG. 6 illustrates a first embodiment of a receiver according to the invention based on a classic superheterodyne device for receiving modified to integrate the characteristic elements of the invention listed here above with reference to FIG. 3.

According to this first embodiment, the signal $S_R$ corresponding to the received data is radiofrequency received on the 5-5.9 GHz bandwidth for example. It is filtered at this bandwidth and then converted into an intermediate frequency by means (41) for transposing into intermediate frequency, delivering data at intermediate frequency.

We again consider two filtering paths 321 and 322, each comprising a 20 MHz band-pass filter filtering the data at intermediate frequency, the band-pass filters assigned to each of the paths being offset relative to each other. Each filtering path can be activated by a distinct variable gain amplifier, respectively the variable gain amplifier 331 for the first filtering path and the variable gain amplifier 332 for the second filtering path. Thus, depending on the desired configuration of reception, the different filtering paths are activated or not activated depending on the value of gain of the amplifier associated with the filtering channel (as described in detail here below with reference to FIG. 7B).

A device for receiving according to the first embodiment comprises means (42) for recombining, that recombine the data coming from the different filtering paths. The pieces of recombined data are then demodulated into baseband by demodulation means (43) on a quadrature path (Q) and a phase path (I). Finally, first means (44) for filtering and for analog-digital conversion of the data demodulated on the quadrature path and second means (45) for filtering and for analog-digital conversion of the demodulated data on the phase path convert the baseband analog data into digital data.

The two radiofrequency channels forming the concatenated channel can be dissociated by means for measuring power (not shown in FIG. 4) that carry out a Fast Fourier Transform (FFT) type digital processing or by linear combination of the phase and quadrature paths with their versions obtained after Hilbert transform. It is then possible to know the respective power values of each of the two radiofrequency channels in intermediate frequency.

With these pieces of information on power, and depending on the sought configurations of reception, a gain control is performed on the variable gain amplifiers situated in the two filtering paths separated into intermediate frequency. This gain control will thus make it possible to go gradually from one configuration of reception to another without disturbance, in combining the two filtering paths in levels of gain and without having to modify the frequency of the transposition means.

As already indicated, a receiver according to this first embodiment has the advantage of limiting the modifications of existing devices. Furthermore, such a device for receiving can belong to a sending/receiving device thus making it possible to pool the constituent elements common to sending and receiving.

Thus, a receiver according to this embodiment reutilizes the components of the classic superheterodyne receiver (or classic superheterodyne transceiver) and furthermore, in a novel and inventive way, integrates at least two distinct filtering paths enabling a dynamic modification of the configuration of reception, i.e. a matching of the reception bandwidth.

Moreover, the fact of reutilizing the components of the classic superheterodyne receiver makes it possible to envisage simplifications in the baseband stage situated after the filtering paths, as described in the two following embodiments.

Besides, this first embodiment has the advantage of using a sampling frequency that is the lowest possible frequency.

It can be noted however that, in this first embodiment, the analog baseband stages of the two paths in phase and in quadrature have to be paired, i.e. parameterized, so that no imbalance of amplitude and phase occurs between the two paths in phase and in quadrature before analog-digital conversion, in order to prevent distortions on the digitized signal.

2.2 Second Embodiment

Thus, a first simplification of the receiver illustrated in FIG. 4, according to a second embodiment represented by FIG. 5, may consist in not directly demodulating the pieces of received data on two paths in phase and in quadrature after filtering in intermediate frequency, but in carrying out a baseband transposition so that a single analog-digital converter is sufficient to sample the totality of the signal.

The frequency of sampling must then be doubled as compared with that of the first embodiment having two components in phase and in quadrature. Thus, according to the IEEE 802.11n standard for example, the sampling frequency must be of the order of 80 MHz. This first simplification is quite achievable given the characteristics of present-day analog-digital converters.

Advantageously, it is possible to get a perfect balancing of the two paths in phase and in quadrature that could be obtained (not shown) after analog-digital conversion.

Indeed, there is no risk of imbalance of amplitude and phase in the second embodiment because the components in phase and in quadrature are separated after the analog-digital conversion.

The structure of the device for receiving according to the second embodiment is shown in FIG. 5 and therefore, in addition to the means for receiving 31, comprises means of filtering 32 comprising two filtering paths, and means of activation 33 as described here above, means of transposition of the received data 51 into intermediate frequency, delivering data in intermediate frequency feeding the filtering paths, means 52 for recombining the data coming from the filtering channels, and means 53 for transposition into baseband, delivering baseband data, and means for filtering and for analog-digital conversion of the baseband data.

2.3 Third embodiment

An additional simplification of the receiver illustrated in FIG. 5 can be implemented according to a third embodiment, in deriving advantage from the performance of the currently available analog-digital converters.

Indeed, present-day analog-digital converters have very wide analog bandwidths in frequency ranges going beyond their sampling frequency, in order to be able to carry out sub-sampling. This technique according to a third embodiment makes it possible to entirely remove the need for the operation of converting intermediate frequency to baseband, in carrying out the analog-digital conversion directly in intermediate frequency after the filtering of two distinct filtering paths.

The converter is for example an analog converter of the AD9433 or AD9204 type by ANALOG DEVICES, or of the MAX19516 or MAX12559 type by MAXIM (registered marks). For example, for the AD9433 type converter, the maximum sampling frequency is 105/125 MSPS (millions of symbols per second, i.e. MHz), and the analog bandwidth extends up to 750 MHz.

Thus, the structure of the receiver is therefore even further simplified, since the data after recombination of the two filtering paths directly reaches the input of the analog-digital converter without necessitating operations of frequency transposition and filtering.

In this case, if the bandwidth of the analog-digital converter encompasses the useful bandwidth of the intermediate frequency signal and, if the sampling frequency is chosen so that the difference between a multiple of this sampling frequency and the intermediate frequency is equal to the bandwidth of a radiofrequency channel, then the baseband signal that will be obtained in digital mode will in every way be equivalent to that of the second embodiment of FIG. 5.

The structure of the device for receiving according to the third embodiment is represented in FIG. 6 and therefore, in addition to the means for receiving 31, comprises means for filtering 32 comprising two filtering paths and means 33 of activation as described here above, means 61 for transposing the received data into intermediate frequency, delivering data in intermediate frequency feeding the filtering channels, means 62 for recombining the data coming from the filtering channels and means 63 of analog-digital conversion of the data coming from the means for recombining.

The means 63 of analog-digital conversion are characterized by their ability to carry out a sub-sampling of the data coming from said means for recombining.

In particular, it can be noted that the sub-sampling frequency depends on the intermediate frequency IF. For example, in taking a value of center intermediate frequency IF of 374 MHz for a first 20 MHz radiofrequency channel, corresponding especially to the EPCOS (registered mark) 374 MHz IF surface acoustic wave filter, the corresponding sub-sampling frequency is equal to 91 MHz (which, multiplied by four gives 364 MHz) and is therefore situated at 20 MHz from the center frequency of a channel with a bandwidth of 40 MHz.

3. Method for Receiving

Figure 7A:
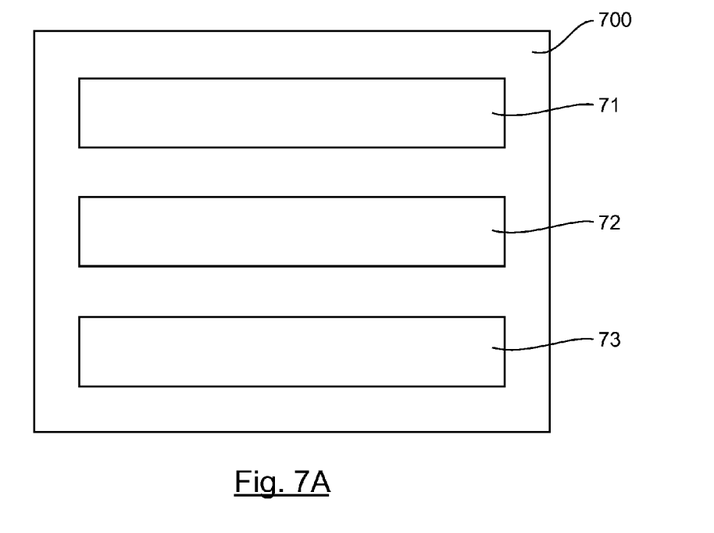
FIGS. 7A and 7B show the main steps implemented by the technique for receiving according to the invention, and gives a more precise description in detail of the step for activating filtering pathss enabling a change-over between two configurations of reception.

Referring to FIG. 7A, we present the main steps of the technique of reception implemented by a receiver according to the invention described here above. According to FIG. 7A, such a method for receiving comprises the following steps:

reception 71 of data transmitted in at least one radiofrequency channel of the concatenated channel, called received data, activation 72 of at least one filtering path from among at least two distinct filtering paths, each filtering path comprising a band-pass filter, the frequency bandwidth of which corresponds to the frequency bandwidth of a radiofrequency channel distinct from the concatenated channel, such that the overall frequency bandwidth of said filter is equal to the frequency bandwidth of the concatenated channel, filtering 73 of the received data, implementing the activated filtering path or paths.

For example, a first application according to the IEEE 802.11n standard is that of receiving data transmitted on a primary channel with a 20 MHz frequency bandwidth and verifying the occupancy of a secondary channel by means of the CCA physical layer mechanism so as to be able, if necessary, to broaden the transmission to a 40 MHz frequency bandwidth.

At the start of the transmission, the gain control implemented by the activation means described here above fixes the level of gain of the second filtering path, associated with the secondary channel, at 0. The second filtering path is therefore deactivated, since the data is transmitted on the primary channel associated with the first filtering path. The gain control implemented by the activation means gradually increases the level of gain until it is enough to carry out a measurement of power while at the same time preventing any exceeding of the level of gain of the primary channel.

In this way, a "scan" of the secondary channel can be done without adding any disturbance to the reception in progress of the primary channel. This modification of the gain control corresponds to "semi-activation" and therefore enables a scanning of the non-used channels without modifying the configuration of reception.

A second application is the activation of the second filtering path, enabling the reception of data on at least two radiofrequency channels forming a concatenated channel. This activation therefore corresponds to the change-over, without interruption, from a mode of reception at 20 MHz to a broadened mode at 40 MHz, for example after obtaining a piece of signaling information carried, for example, by a signaling bit HT-SIG2 on the primary channel.

Figure 7B:
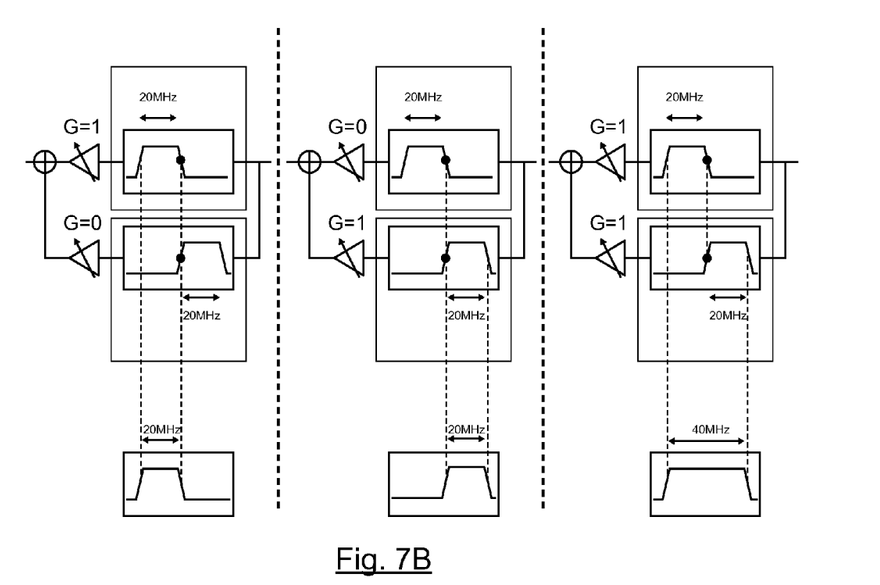

FIG. 7B illustrates the main characteristics of the change-over from transmission on a 20 MHz bandwidth to transmission on a 40 MHz bandwidth and especially of the step for activating the second filtering path for this application.

As already indicated, the two 20 MHz band-pass filters each associated with a distinct filtering path must comply with the constraints of each filtering path in order to be correctly added together to generate a 40 MHz filter. Each band-pass filter is therefore offset by 10 MHz relative to the center intermediate frequency IF (for example the center frequency of the band-pass filter of the first filtering path is equal to FI+10 MHz and the center frequency of the band-pass filter of the second filtering path is equal to FI−10 MHz).

The activation of one and/or other of the filtering paths is illustrated in FIG. 7B. In particular, FIG. 7B illustrates the configurations of reception corresponding respectively to:

the activation of the first filtering path, i.e. a band-pass filter having a bandwidth of 20 MHz on the upper part of the 40 MHz concatenated channel corresponding for example to the primary channel and enabling the reception of data on this primary channel;

the activation of the second filtering path, i.e. a band-pass filter having a bandwidth of 20 MHz on the lower part of the 40 MHz concatenated channel corresponding to the secondary channel and enabling reception of data on this secondary channel;

the activation of the two filtering paths, i.e. the above two 20 MHz band-pass filters, defining a "overall" filter with a bandwidth of 40 MHz, enabling the reception of data on primary channel and on the secondary channel.

The difference between the different configurations (20 MHz primary, 20 MHz secondary, 40 MHz) is achieved by modifying the gain controls with a gain G=1 to activate the selected filtering path or with a gain G=0 to deactivate it. In other words, for reception on the primary channel alone, the variable gain amplifier associated with the first filtering path is equal to 1 and the variable gain amplifier associated with the second filtering path is equal to 0. For reception on the secondary channel alone, the variable gain amplifier associated with the first filtering path is equal to 0 and the variable gain amplifier associated with the second filtering path is equal to 1. For reception on a 40 MHz band, the variable gain amplifier associated with the first filtering path and the variable gain amplifier associated with the second filtering path is equal to 1. This activation/deactivation which can be gradual has the advantage of being fluid and of causing no break in transmission/reception because no signification modification is caused on each filtering path.

Although the present disclosure has been described with reference to one or more examples, workers skilled in the art will recognize that changes may be made in form and detail without departing from the scope of the disclosure and/or the appended claims.

The invention claimed is:

1. A device for receiving data transmitted in a communications network using a plurality of radiofrequency channels, at least two adjacent radiofrequency channels being concatenated to form a concatenated channel, wherein the device comprises:
   means for receiving data transmitted in at least one radiofrequency channel of said concatenated channel, called received data,
   means for transposing said received data into an intermediate frequency, delivering data at the intermediate frequency,
   means for filtering said data at the intermediate frequency, said means for filtering comprising at least two distinct filtering paths, each filtering path comprising a band-pass filter, the frequency bandwidth of which corresponds to the frequency bandwidth of a distinct radiofrequency channel of said concatenated channel, such that the overall frequency bandwidth of said filters is equal to the frequency bandwidth of said concatenated channel,
   means for activating at least one of said filtering paths, enabling the filtering of said received data, and
   means for recombining the data coming from said filtering paths.

2. The device for receiving according to claim 1, wherein said means for activating comprise at least one variable gain amplifier.

3. The device for receiving according to claim 1, wherein said band-pass filters have templates intersecting at −6db.

4. The device for receiving according to claim 1, wherein the device comprises means for measuring the power of said received data on each radiofrequency channel of said concatenated channel, and wherein said means for activating take account of said measurements of power.

5. The device for receiving according to claim 1, wherein the device comprises means for obtaining a piece of signaling information, signaling a transmission of said data received on at least one radiofrequency channel of said concatenated channel, and wherein said means for activating take account of said piece of signaling information.

6. The device for receiving according to claim 1, wherein said device furthermore comprises:
   means for demodulating data coming from said means for recombining, delivering demodulated data on a quadrature path and a phase path;
   first means for filtering and for analog-digital conversion of the data demodulated on said quadrature path; and
   second means for filtering and for analog-digital conversion of the demodulated data on said phase path.

7. The device for receiving according to claim 1, wherein said device also comprises:
- means for transposing, into baseband, the data coming from said means for recombining, delivering baseband data; and
- means for filtering and for analog-digital conversion of said baseband data.

8. The device for receiving according to claim 1, wherein said device furthermore comprises:
- means of analog-digital conversion of the data coming from said means for recombining.

9. A method for receiving data transmitted in a communications network using a plurality of radiofrequency channels, at least two adjacent radiofrequency channels being concatenated to form a concatenated channel, wherein the method comprises:
- receiving data transmitted in at least one radiofrequency channel of said concatenated channel, called received data,
- activating at least one filtering path among at least two distinct filtering paths, each filtering path comprising a band-pass filter, having a frequency bandwidth that corresponds to a frequency bandwidth of a distinct radiofrequency channel of said concatenated channel, such that an overall frequency bandwidth of said filters is equal to a frequency bandwidth of said concatenated channel, and
- filtering said received data, implementing said activated filtering path or paths.

10. A non-transitory recording medium comprising a computer program comprising instructions for implementing a method for receiving data transmitted in a communications network using a plurality of radiofrequency channels, at least two adjacent radiofrequency channels being concatenated to form a concatenated channel, when this program is executed by a processor, wherein the method comprises:
- receiving data transmitted in at least one radiofrequency channel of said concatenated channel, called received data,
- activating at least one filtering path among at least two distinct filtering paths, each filtering path comprising a band-pass filter having a frequency bandwidth that corresponds to a frequency bandwidth of a distinct radiofrequency channel of said concatenated channel, such that an overall frequency bandwidth of said filters is equal to a frequency bandwidth of said concatenated channel, and
- filtering said received data, implementing said activated filtering path or paths.

* * * * *